US006301058B2

United States Patent
Nagahara (10) Patent No.: US 6,301,058 B2
(45) Date of Patent: Oct. 9, 2001

(54) WIDE-ANGLE LENS

(75) Inventor: Akiko Nagahara, Koshigaya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/766,848

(22) Filed: Jan. 23, 2001

(30) Foreign Application Priority Data

Jan. 28, 2000 (JP) .................................................. 12-019533

(51) Int. Cl.⁷ .............................. G02B 3/00; G02B 13/04; G02B 9/34
(52) U.S. Cl. ............................ 359/650; 359/753; 359/783
(58) Field of Search .................................... 359/649–651, 359/753, 783

(56) References Cited

U.S. PATENT DOCUMENTS 5,795,047 * 8/1998 Sannohe et al. ...................... 359/650
6,088,169   7/2000 Ohno .................................... 359/682
6,137,638 * 10/2000 Yamagishi et al. ................... 359/649

FOREIGN PATENT DOCUMENTS 10-260346   9/1998  (JP) .

* cited by examiner

Primary Examiner—Evelyn A Lester
(74) Attorney, Agent, or Firm—Arnold International; Bruce Y. Arnold (57) ABSTRACT

A wide-angle lens of fixed focal length formed of four lens groups of negative, positive, positive and positive refractive power, respectively, in order from the enlarging side is disclosed. The fourth lens group as well as one of the lens groups of among the first lens group, the second lens group and the third lens group are fixed in position. The other two lens groups of among the first lens group, the second lens group and the third lens group are moved during focusing, and specified conditions are satisfied in order to: (1) insure that the wide-angle lens is nearly telecentric on its reducing side, (2) maintain favorable correction of aberrations, (3) maintain a sufficiently large back focus for insertion of necessary components, and (4) enable the wide-angle lens to be compact. Preferably, the movement amount during a given focus adjustment of one of the two moveable lens groups is directly proportional to the movement amount of the other moveable lens group.

16 Claims, 6 Drawing Sheets

WIDE-ANGLE LENS

BACKGROUND OF THE INVENTION

Various color liquid crystal projectors have previously been proposed in which different light beams are optically superimposed so as to be projected onto a screen to form a full color image. Each beam is modulated by a different liquid crystal light valve array having picture information input thereto that corresponds to a color component of the image. After the different component light beams are combined, the combined beam is projected onto a screen so that the full-color image can be viewed.

Recently, it has become important for color liquid crystal projectors to have sufficient brightness so as to be viewed in a room under conditions of partial lighting. This requirement, combined with the trend toward smaller pixel size and higher resolution of LCD light valves, has made it imperative that the projection lens of a color liquid crystal projector have high resolution and form a bright image. Also, a very long back focus is required in such a projection lens so that a color-synthesizing optical element can be inserted in the space between the projection lens and the liquid crystal light valve arrays.

Furthermore, it is desirable that the projection lens be telecentric on its reducing side. Retrofocus lenses, as used for wide-angle lenses of single-lens reflex cameras, have been known as wide-angle lenses that have a long back focus. However, retrofocus lenses used as wide-angle lenses of conventional single-lens reflex cameras have a steep emitting angle and thus are not telecentric on the side of the light source. As a result, when such retrofocus lenses are used, a problem arises in that irregular colors occur on the viewing screen. Therefore, conventional retrofocus lenses cannot be used as projection lenses for color liquid crystal video projectors.

In conventional focusing methods for projection lenses, in order to maintain a stationary image surface during focusing, a method wherein the entire lens is integrally moved and a method wherein plural lens groups are moved independently are known. However, in such conventional focusing methods there are problems in that the structure for mounting and moving the movable components becomes complicated.

As a technique for solving problems as discussed above, applicant previously disclosed a retrofocus lens in Japanese Laid Open Patent Application H10-260346. Techniques described in this patent can solve the problems as described above. On the other hand, it is difficult to realize a lens having an $F_{NO}$ in the range of 3.5–4.0. Nevertheless, applicant invented such a projection lens in order to produce a brighter image, as disclosed in Japanese Patent Application No. H11-351693. The overall length of the projection lens disclosed in this application is about 9.2 units in the case where the focal distance of the projection lens is 1 unit. Thus, as compared to similar conventional techniques, although providing a compact lens, there remains a demand for further miniaturization.

BRIEF SUMMARY OF THE INVENTION

This present invention relates to a wide-angle lens, and particularly to a wide-angle lens suitable for use within a color liquid crystal projector, wherein the overall length of the projection lens is about 70% of the overall length of the projection lens that is disclosed in Japanese Patent Application No. H11-351693. Thus, the present invention is a radical change from the focusing system disclosed in that patent application.

A first object of the present invention is to provide a bright wide-angle lens of simplified construction that has a sufficient back focus to allow for other components to be inserted. A second object is to provide such a lens that is nearly telecentric and enables the overall length of the lens to be shortened, thereby allowing the wide-angle lens to be miniaturized while maintaining a high image quality.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The wide-angle lens of this invention is formed of only four lens groups having refractive power, in order from the enlarging side, of: a first lens group of negative refractive power, a second lens group of positive refractive power, a third lens group of positive refractive power, and a fourth lens group of positive refractive power. The fourth lens group is fixed in position and two lens groups selected from among the first lens group, the second lens group, and the third lens group are moved along the optical axis in order to perform focus adjustment. Moreover, it is preferred that the wide-angle lens satisfy the following conditions.

$-1.5 < f_1/f < -0.5$  Condition (1)

$-11.0 < f_{13}/f < 3.0$  Condition (2)

$1.5 < f_4/f < 3.0$  Condition (3)

where $f_1$ is the focal distance of the first lens group, f is the focal distance of the wide-angle lens, $f_{13}$ is the combined focal distance of the first, second, and third lens groups, and $f_4$ is the focal distance of the fourth lens group.

Furthermore, it is preferable that the respective amounts of movement of said two lens groups for making a given focus adjustment are different and in a proportional relation, and the proportional relation remains constant for different amounts of focus adjustment of the wide-angle lens. In addition, it is preferable that the two lens groups that are moved during focus adjustment are the second lens group and the third lens group. And, it is preferable that the third lens group contains at least one single optical element composed of a positive lens element and a negative lens element that are joined, or contains a multiple component lens formed of a positive lens element and a negative lens element, respectively.

The wide-angle lens of this invention enables simplification of the structure near the mounting portion of the wide-angle lens by employing four lens groups of negative, positive, positive, and positive refractive power in order from the enlarging side of the wide-angle lens.

Moreover, the wide-angle lens of this invention enables one to conduct high-accuracy focusing by moving two lens groups selected from among the first lens group, the second lens group, and the third lens group. Furthermore, satisfying the above Conditions (1)–(3) enables the wide-angle lens to be well-corrected for aberrations while simultaneously enabling it to be compact. If the upper and lower limits of these conditions are not satisfied, it becomes difficult to keep the overall length of the lens system short, the back focus sufficiently large for insertion of necessary components, and to maintain a proper balance of the aberrations. Further, satisfying Conditions (1)–(3) also enables the wide-angle lens to be nearly telecentric on its reducing side.

Since a single cam may not be used as a moving mechanism for focusing, the structure of the lens-moving mechanism can nevertheless be simplified by making the movement amount during focusing of one of the two moveable lens groups be directly proportional to the movement amount of the other moveable lens group.

Moreover, if the above two moving lens groups are taken as the second lens group and the third lens group, the first lens group, which is largest in size, can be fixed in position. Such a lens system is termed the "inner-focusing type". This type of lens system is especially useful in the case of automatic focus adjustment, since the components to be moved are of less mass. It is also advantageous in that the overall length of such a lens system does not change during focusing.

It is possible to keep the aberrations of the wide-angle lens favorable by having the third lens group include a combined lens formed of a positive lens element and a negative lens element that are joined, or of a positive lens element and a negative lens element that are separate.

Figure 1:
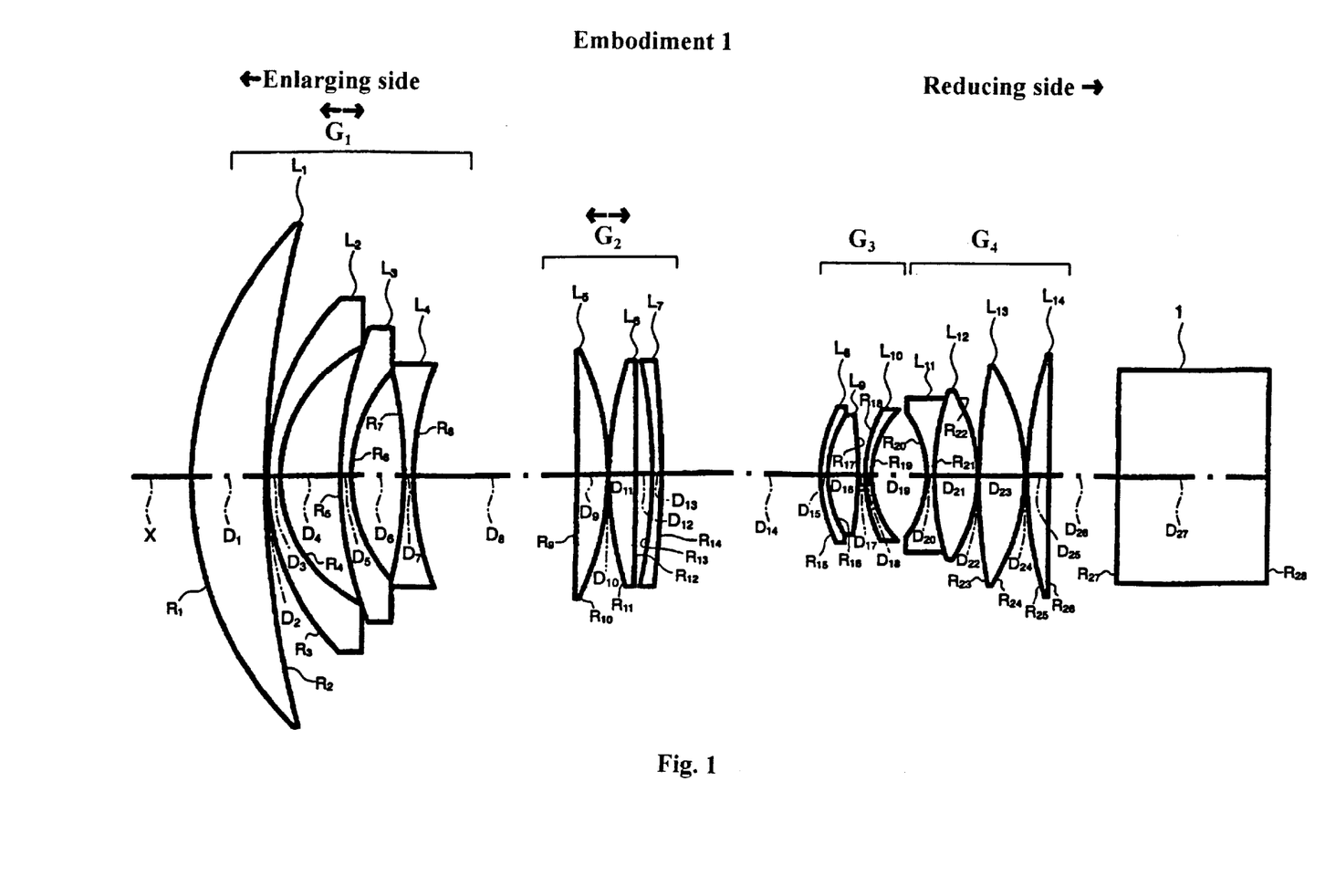
FIG. 1 shows the basic lens element configuration of the wide-angle lens of Embodiment 1.
Figure 2:
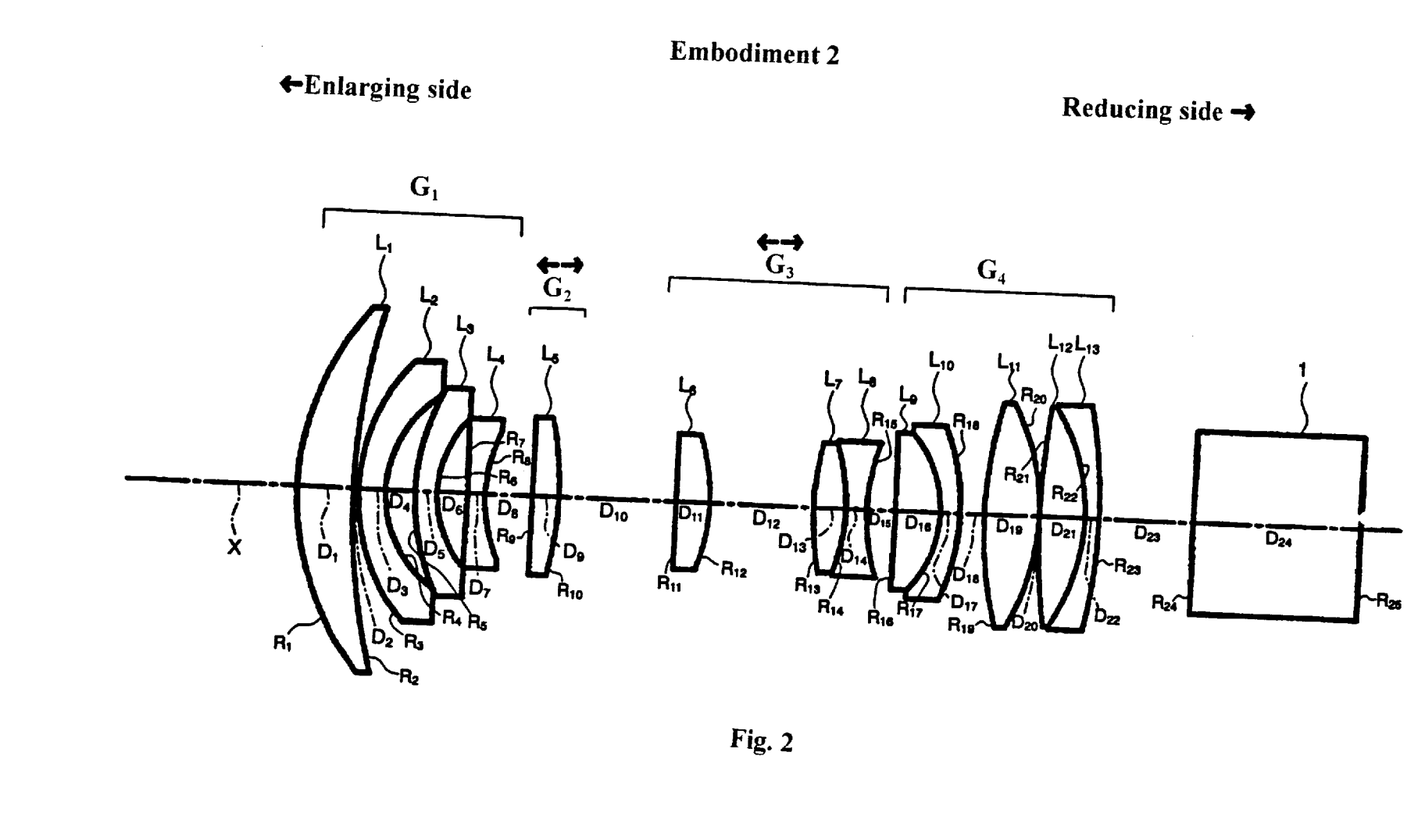
FIG. 2 shows the basic lens element configuration of the wide-angle lens of Embodiment 2.
Figure 3:
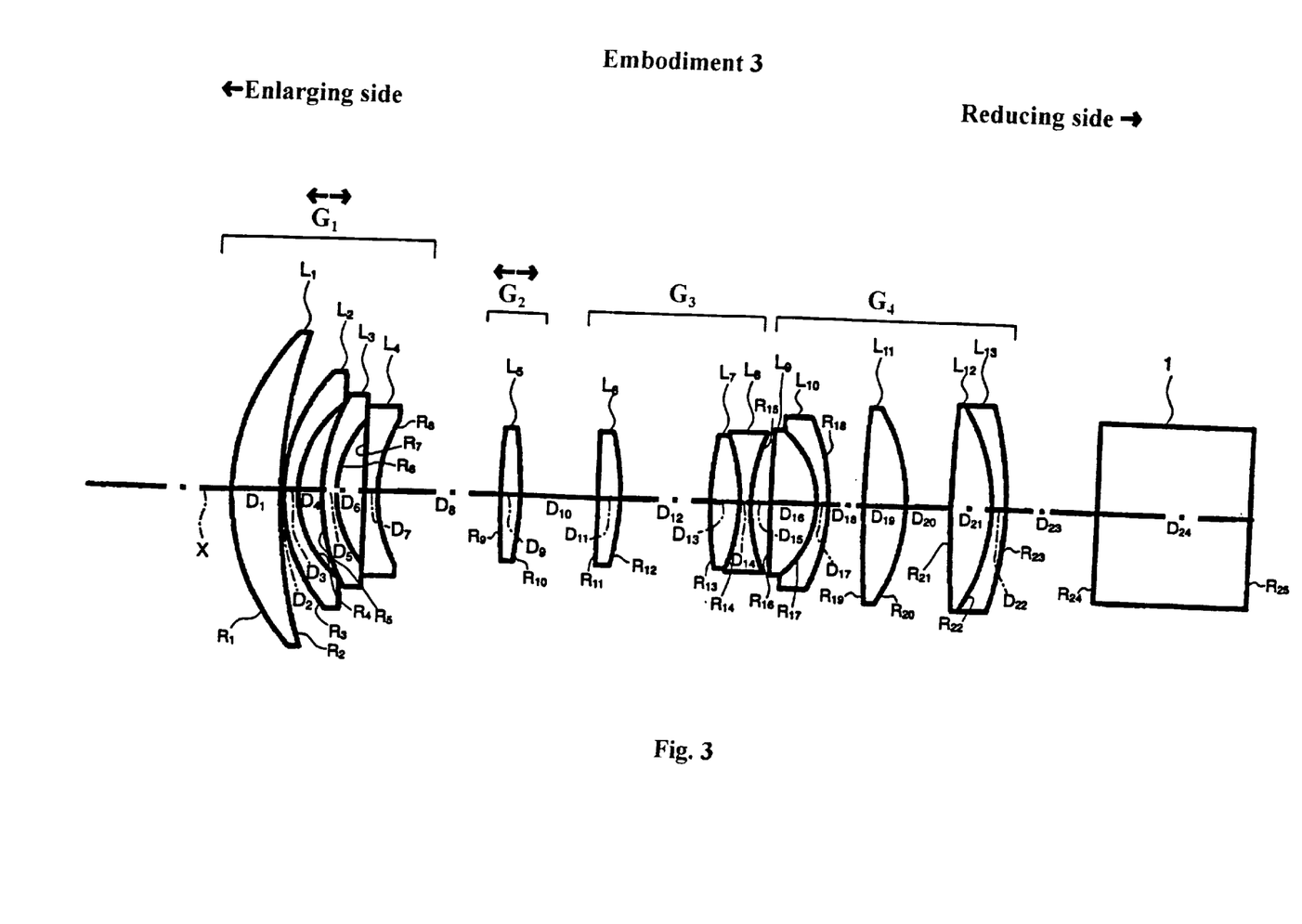
FIG. 3 shows the basic lens element configuration of the wide-angle lens of Embodiment 3.
Figure 4A:
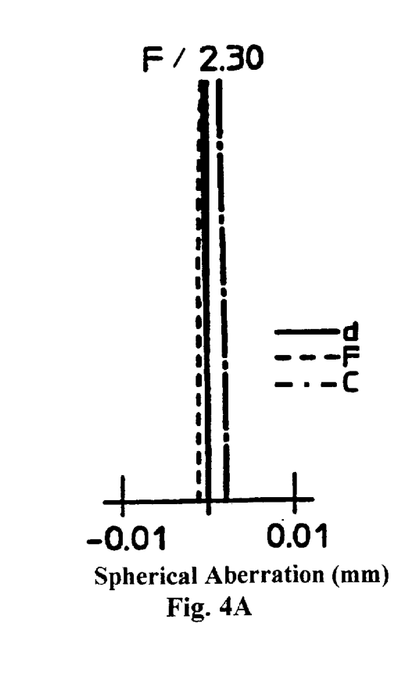
FIGS. 4A–4D show the spherical aberration, astigmatism, distortion and lateral color, respectively, for Embodiment 1 of the invention at a magnification of −0.013.
Figure 4B:
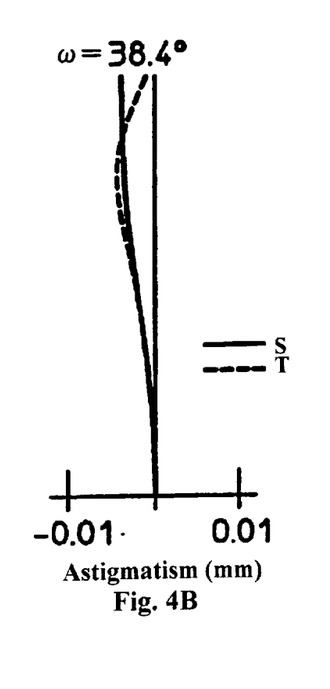
Figure 4C:
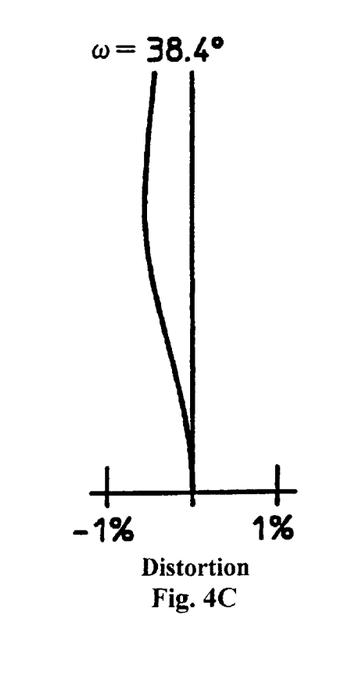
Figure 4D:
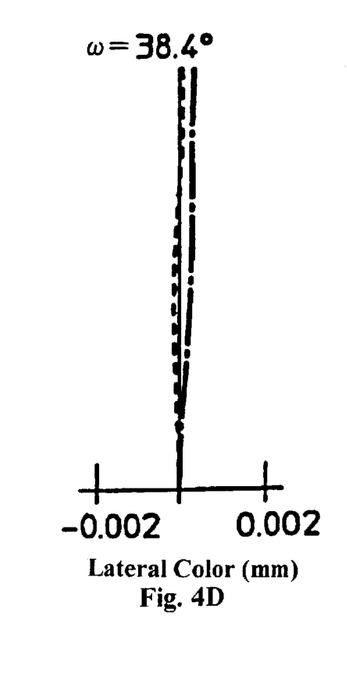
Figure 5A:
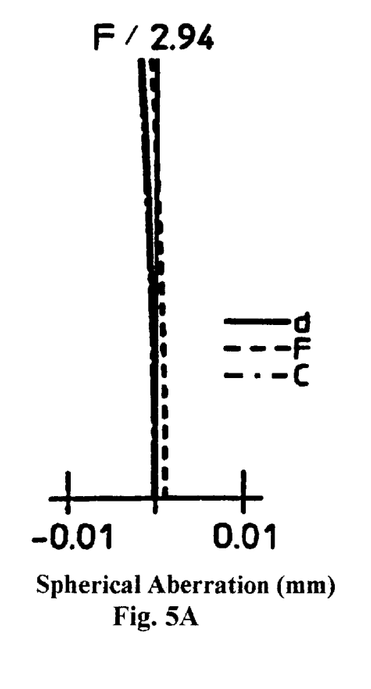
FIGS. 5A–5D show the spherical aberration, astigmatism, distortion and lateral color, respectively, for Embodiment 2 of the invention at a magnification of −0.013; and, FIG. 6A–6D show the spherical aberration, astigmatism, distortion and lateral color, respectively, for Embodiment 3 of the invention at a magnification of −0.013.
Figure 5B:
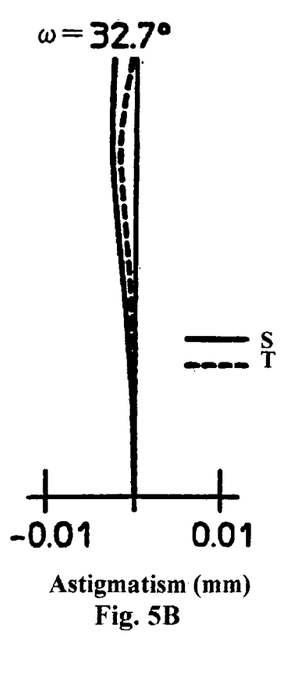
Figure 5C:
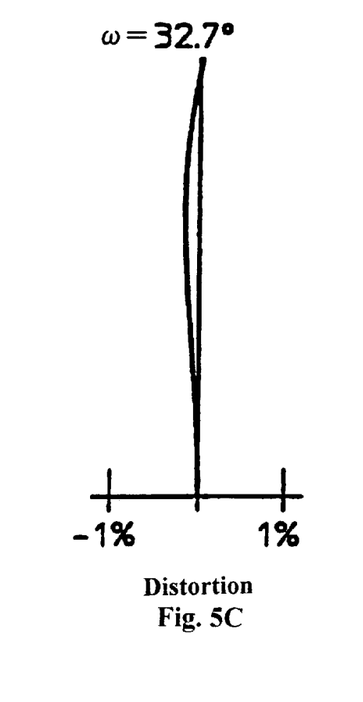
Figure 5D:
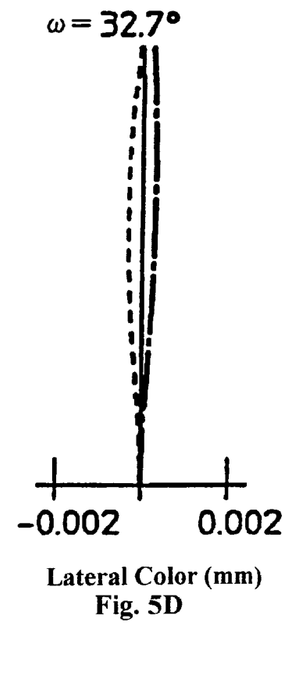
Figure 6A:
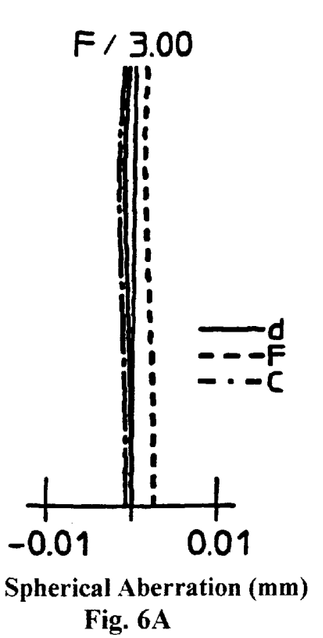
Figure 6B:
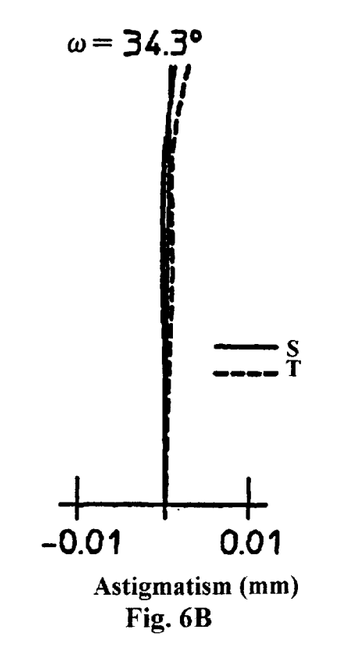
Figure 6C:
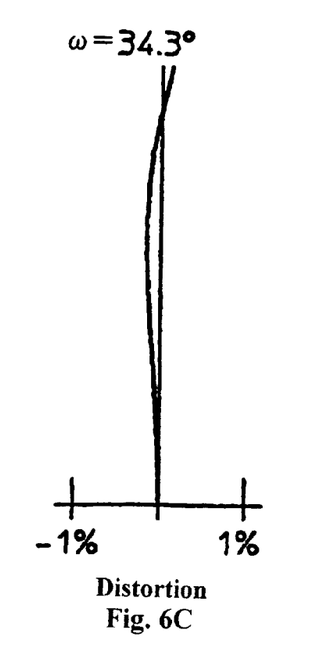
Figure 6D:
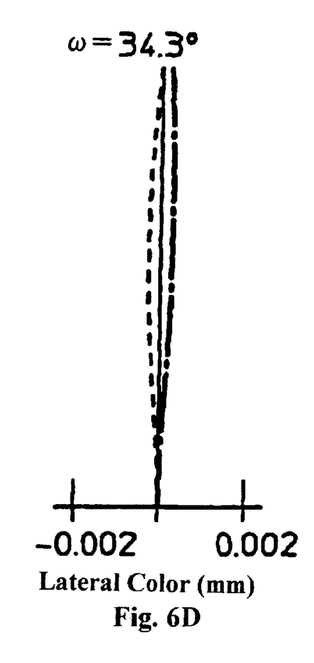

Embodiments 1–3 of the invention are illustrated in FIGS. 1–3, respectively. In each of these embodiments four lens groups are arranged as follows, in order from the enlarging side: a first lens group $G_1$ having negative refractive power, a second lens group $G_2$ having positive refractive power, a third lens group $G_3$ having positive refractive power, and a fourth lens group $G_4$ having positive refractive power. An optical component 1 (e.g., a color-synthesizing prism) is arranged on the reducing side, and thus a sufficient back focus of the wide-angle lens is needed to insert the optical component 1. In Embodiments 1 and 3, the first lens group $G_1$ and the second lens group $G_2$ are moved along the optical axis X for focusing. In Embodiment 2, the second lens group $G_2$ and the third lens group $G_3$ are moved along the optical axis X for focusing. In each embodiment the third lens group $G_3$ includes a combined lens formed of a positive lens element and a negative lens element that are joined in order to reduce aberrations.

Embodiment 1

As illustrated in FIG. 1, this embodiment employs 14 lens elements, and the first lens group $G_1$ and the second lens group $G_2$ are moved for focusing. The first lens group $G_1$ is formed of, in order from the enlarging side, a positive meniscus lens element $L_1$ with is convex surface on the enlarging side, negative meniscus lens elements $L_1$, $L_3$ each with its convex surface on the enlarging side, and a biconcave lens element $L_4$.

The second lens group $G_2$ is formed of, in order from the enlarging side: a positive meniscus lens element $L_5$ with its convex surface on the reducing side; a biconvex lens element $L_6$ having surfaces of different radii of curvature, with the surface of smaller radius of curvature on the enlarging side; and a negative meniscus lens element $L_7$ with its convex surface on the reducing side.

The third lens group $G_3$ is formed of, in order from the enlarging side: a negative meniscus lens element $L_8$ with its convex surface on the enlarging side; a biconvex lens element $L_9$ having surfaces of different radii of curvature, with the surface of smaller radius of curvature on the enlarging side; and a negative meniscus lens element $L_{10}$ with its convex surface on the enlarging side.

The fourth lens group $G_4$ is formed of, in order from the enlarging side: a combined lens formed of a biconcave lens element $L_{11}$ having surfaces of different radii of curvature with the surface of smaller radius of curvature on the enlarging side and joined to a biconvex lens element $L_{12}$ having surfaces of different radii of curvature, with the surface of smaller radius of curvature on the reducing side; a biconvex lens element $L_{13}$ having surfaces of different radii of curvature, with its surface of smaller radius of curvature on the reducing side; and a piano-convex lens element $L_{14}$ with its convex surface on the enlarging side.

Table 1 below lists the surface number # in order from the enlarging side, the radius of curvature R (in mm) of each surface, the on-axis spacing D (in mm) between surfaces, as well as the index of refraction $N_d$ and the Abbe number $\upsilon_d$ (both at the d line) of each lens element of the wide-angle lens of Embodiment 1. The values of D8 and D14 at a magnification of –0.013 are shown in the middle part of the Table 1. In the bottom part of the table are listed the values $f_1/f$, $f_3/f$, and $f_4/f$. By comparing these values with the above Conditions 1–3, it can be seen that Embodiment 1 satisfies each of Conditions 1–3.

TABLE 1

| # | R | D | $N_d$ | $\upsilon_d$ |
|---|---|---|---|---|
| 1 | 3.263 | 0.649 | 1.71300 | 53.9 |
| 2 | 8.768 | 0.013 | | |
| 3 | 2.316 | 0.112 | 1.62041 | 60.3 |
| 4 | 1.294 | 0.519 | | |
| 5 | 3.567 | 0.099 | 1.77250 | 49.6 |
| 6 | 1.403 | 0.469 | | |
| 7 | –4.008 | 0.079 | 1.84666 | 23.9 |
| 8 | 2.764 | 1.419 | | |
| 9 | –63.041 | 0.265 | 1.71300 | 53.9 |
| 10 | –2.688 | 0.010 | | |
| 11 | 3.624 | 0.228 | 1.84666 | 23.9 |
| 12 | –73.945 | 0.150 | | |
| 13 | –4.782 | 0.082 | 1.72342 | 38.0 |
| 14 | –8.705 | 1.459 | | |
| 15 | 1.329 | 0.066 | 1.84666 | 23.9 |
| 16 | 1.027 | 0.268 | 1.48749 | 70.4 |
| 17 | –3.739 | 0.060 | | |
| 18 | 1.287 | 0.056 | 1.51680 | 64.2 |
| 19 | 0.860 | 0.474 | | |
| 20 | –1.032 | 0.069 | 1.84666 | 23.9 |
| 21 | 2.471 | 0.385 | 1.48749 | 70.4 |
| 22 | –1.454 | 0.010 | | |
| 23 | 5.158 | 0.412 | 1.62041 | 60.3 |
| 24 | –1.811 | 0.019 | | |
| 25 | 3.683 | 0.193 | 1.84666 | 23.9 |
| 26 | ∞ | 0.231 | | |
| 27 | ∞ | 1.412 | 1.51633 | 64.1 |
| 28 | ∞ | | | |

TABLE 1-continued

| # | R | D | $N_d$ | $v_d$ |
|---|---|---|---|---|
| At magnification of −0.013: D8 = 1.437 | | | | |
| | | D14 = 1.435 | | |
| $f_1/f = -1.12$   $f_{13}/f = 1.33$   $f_4/f = 2.45$ | | | | |

FIGS. 4A–4D show the spherical aberration, astigmatism, distortion and lateral color, respectively, of the wide-angle lens of Embodiment 1. The spherical aberration is shown for the d, F and C lines, and the astigmatism is shown for both the sagittal S and tangential T planes. From these figures, it is evident that the wide-angle lens of Embodiment 1 favorably corrects these aberrations so as to provide a high quality image.

Embodiment 2

As illustrated in FIG. 2, this embodiment employs only 13 lens elements, and the second lens group $G_2$ and the third lens group $G_3$ are moved for focusing. This enables the first lens group, which is the lens group of largest mass, to be fixed during focusing, thereby enabling more rapid focus adjustment when automatic focus adjustment is used. An advantage of this embodiment is that the overall length of the wide-angle lens remains constant since an "inner-focusing type" arrangement is used.

Embodiment 2 differs from Embodiment 1 in that the arrangement of lens elements in lens groups $G_2$–$G_4$ is different. In this embodiment: the second lens group $G_2$ is formed of a single plano-convex lens element $L_5$ with its convex surface on the reducing side; the third lens group $G_3$ is formed of a plano-convex lens element $L_6$ with its convex surface on the reducing side, a biconvex lens element $L_7$, and a biconcave lens element $L_8$; and the fourth lens group $G_4$ is formed of a combined lens composed of a positive meniscus lens element $L_9$ with its convex surface on the reducing side, and a negative meniscus lens element $L_{10}$ with its convex surface on the reducing side, a biconvex lens element $L_{11}$ having surfaces of different radii of curvature, with the surface of smaller radius of curvature on the reducing side, a biconvex lens element $L_{12}$ having surfaces of different radii of curvature, with the surface of smaller radius of curvature on the reducing side, and a negative meniscus lens element $L_{13}$ with its convex surface on the reducing side.

Table 2 below lists the surface number # in order from the enlarging side, the radius of curvature R (in mm) of each surface, the on-axis spacing D (in mm) between surfaces, as well as the index of refraction $N_d$ and the Abbe number $v_d$ (both at the d line) of each lens element of the wide-angle lens of Embodiment 2. The values of D8, D10 and D14 at a magnification of −0.013 are shown in the middle part of the Table 2. In the bottom part of the table are listed the values $f_1/f$, $f_{13}/f$, and $f_4/f$. By comparing these values with the above Conditions 1–3, it can be seen that Embodiment 2 satisfies each of Conditions 1–3.

TABLE 2

| # | R | D | $N_d$ | $v_d$ |
|---|---|---|---|---|
| 1 | 2.189 | 0.437 | 1.71300 | 53.9 |
| 2 | 5.223 | 0.044 | | |
| 3 | 1.517 | 0.217 | 1.83400 | 37.3 |
| 4 | 0.928 | 0.227 | | |
| 5 | 1.786 | 0.165 | 1.83400 | 37.3 |
| 6 | 0.867 | 0.232 | | |
| 7 | −24.580 | 0.136 | 1.84665 | 23.8 |

TABLE 2-continued

| # | R | D | $N_d$ | $v_d$ |
|---|---|---|---|---|
| 8 | 1.211 | 0.354 | | |
| 9 | ∞ | 0.210 | 1.84665 | 23.8 |
| 10 | −2.622 | 0.929 | | |
| 11 | ∞ | 0.274 | 1.49700 | 81.6 |
| 12 | −1.437 | 0.835 | | |
| 13 | 2.321 | 0.255 | 1.84665 | 23.8 |
| 14 | −1.582 | 0.158 | 1.83400 | 37.3 |
| 15 | 1.582 | 0.224 | | |
| 16 | −18.802 | 0.355 | 1.49700 | 81.6 |
| 17 | −0.900 | 0.149 | 1.84665 | 23.8 |
| 18 | −1.791 | 0.182 | | |
| 19 | 3.342 | 0.432 | 1.49700 | 81.6 |
| 20 | −1.788 | 0.004 | | |
| 21 | 5.712 | 0.373 | 1.49700 | 81.6 |
| 22 | −1.535 | 0.166 | 1.84665 | 23.8 |
| 23 | −3.988 | 0.748 | | |
| 24 | ∞ | 1.321 | 1.51633 | 64.1 |
| 25 | ∞ | | | |
| At magnification of −0.013: D8 = 0.370 | | | | |
| | | D10 = 0.910 | | |
| | | D15 = 0.227 | | |
| $f_1/f = -0.90$   $f_{13}/f = -9.20$   $f_4/f = 1.79$ | | | | |

FIGS. 5A–5D show the spherical aberration, astigmatism, distortion and lateral color, respectively, of the wide-angle lens of Embodiment 2. The spherical aberration is shown for the d, F and C lines, and the astigmatism is shown for both the sagittal S and tangential T planes. From these figures, it is evident that the wide-angle lens of Embodiment 2 favorably corrects these aberrations so as to provide a high quality image.

Embodiment 3

As illustrated in FIG. 3, this embodiment employs only 13 lens elements (the same number as in Embodiment 2), but the first lens group $G_1$ and the second lens group $G_2$ are moved for focusing (as in Embodiment 1). The lens element arrangement of this Embodiment differs from that of Embodiment 2 in that, in this embodiment: lens element $L_4$ of the first lens group $G_1$ is a plano-concave lens with its concave surface on the reducing side; the lens element $L_5$ of the second lens group $G_2$ is a biconvex lens; and, the lens element $L_9$ of the fourth lens group $G_4$ is a biconvex lens having different radii of curvature, with the surface of smaller radius of curvature on the reducing side.

Table 3 below lists the surface number # in order from the enlarging side, the radius of curvature R (in mm) of each surface, the on-axis spacing D (in mm) between surfaces, as well as the index of refraction $N_d$ and the Abbe number $v_d$ (both at the d line) of each lens element of the wide-angle lens of Embodiment 3. The values of D8, and D10 at a magnification of −0.013 are shown in the middle part of the Table 3. In the bottom part of the table are listed the values $f_1/f$ $f_3/f$, and $f_4/f$. As is apparent by comparing these values with the above Conditions 1–3, it can be seen that Embodiment 3 satisfies each of Conditions 1–3.

TABLE 3

| # | R | D | $N_d$ | $v_d$ |
|---|---|---|---|---|
| 1 | 1.846 | 0.412 | 1.71300 | 53.9 |
| 2 | 4.236 | 0.027 | | |
| 3 | 1.438 | 0.124 | 1.83400 | 37.3 |
| 4 | 0.897 | 0.196 | | |
| 5 | 1.617 | 0.124 | 1.83400 | 37.3 |
| 6 | 0.861 | 0.234 | | |
| 7 | ∞ | 0.110 | 1.84666 | 23.8 |
| 8 | 1.196 | 0.997 | | |

TABLE 3-continued

| # | R | D | $N_d$ | $v_d$ |
|---|---|---|---|---|
| 9 | 6.172 | 0.165 | 1.74077 | 27.8 |
| 10 | −3.363 | 0.677 | | |
| 11 | ∞ | 0.192 | 1.49700 | 81.6 |
| 12 | −2.013 | 0.772 | | |
| 13 | 2.801 | 0.247 | 1.84665 | 23.8 |
| 14 | −1.514 | 0.096 | 1.83400 | 37.3 |
| 15 | 1.514 | 0.161 | | |
| 16 | 22.870 | 0.384 | 1.49700 | 81.6 |
| 17 | −0.774 | 0.096 | 1.84666 | 23.8 |
| 18 | −1.689 | 0.298 | | |
| 19 | 10.512 | 0.357 | 1.49700 | 81.6 |
| 20 | −1.476 | 0.380 | | |
| 21 | 10.512 | 0.357 | 1.49700 | 81.6 |
| 22 | −1.476 | 0.124 | 1.84665 | 23.8 |
| 23 | −2.715 | 0.768 | | |
| 24 | ∞ | 1.276 | 1.51633 | 64.1 |
| 25 | ∞ | | | |

At magnification of −0.013: D8 = 1.011
D10 = 0.653
$f_1/f = -0.94$   $f_{13}/f = -4.61$   $f_4/f = 1.87$ FIGS. 6A–6D show the spherical aberration, astigmatism, distortion and lateral color, respectively, of the wide-angle lens of Embodiment 3. The spherical aberration is shown for the d, F and C lines, and the astigmatism is shown for both the sagittal S and tangential T planes. From these figures, it is evident that the wide-angle lens of Embodiment 3 favorably corrects these aberrations so as to provide a high quality image.

As described above, the wide-angle lens of this invention provides a simplified structure as to mounting the lens elements as a result of the lens group arrangement having four lens groups of, in order from the enlarging side, negative, positive, positive, and positive refractive power, with the fourth lens group being fixed in position. Moreover, a high-accuracy focusing can be conducted by moving only two lens groups of among the first, second, and third lens groups.

The invention being thus described, it will be obvious that the same may be varied in many ways. For example, a combined lens that is composed of a positive lens element and a negative lens element is used in the third lens group $G_3$ of each embodiment described above. However, these positive and negative lens elements may be separate. Furthermore, the wide-angle lens of this invention is not limited to use with color liquid crystal projectors, but may also be used with projectors that employ other means to modulate a light beam with image information, such as digital micro-mirror devices (DMD's), silver salt films, and so on. And, the wide-angle lens of this invention may also be used with image pickup elements, such as an image pickup tube. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A wide-angle lens of a fixed focal length consisting of four lens groups having refractive power, in order from the enlarging side, as follows:
 a first lens group of negative refractive power;
 a second lens group of positive refractive power;
 a third lens group of positive refractive power; and
 a fourth lens group of positive refractive power;
 wherein
  the fourth lens group is fixed in position during focus adjustment; and
  two lens groups from among the first lens group, the second lens group and the third lens group are moved along the optical axis during focus adjustment.

2. The wide-angle lens of claim 1, wherein the following conditions are satisfied:

$$-1.5 < f_1/f < -0.5 \qquad \text{Condition (1)}$$

$$-11.0 < f_{13}/f < 3.0 \qquad \text{Condition (2)}$$

$$1.5 < f_4/f < 3.0 \qquad \text{Condition (3)}$$

where
 $f_1$ is the focal distance of the first lens group,
 f is the focal distance of the wide-angle lens,
 $f_{13}$ is the combined focal distance of the first, second and third lens groups, and
 $f_4$ is the focal distance of the fourth lens group.

3. The wide-angle lens of claim 1 wherein, of the two lens groups that are moved during focusing, the respective amounts of movement of said two lens groups for making a given focus adjustment are different and in a proportional relation, and the proportional relation remains constant for different amounts of focus adjustment of the wide-angle lens.

4. The wide-angle lens of claim 2 wherein, of the two lens groups that are moved during focusing, the respective amounts of movement of said two lens groups for making a given focus adjustment are different and in a proportional relation, and the proportional relation remains constant for different amounts of focus adjustment of the wide-angle lens.

5. The wide-angle lens of claim 1, wherein the two lens groups that move for focus adjustment are the second lens group and the third lens group.

6. The wide-angle lens of claim 2, wherein the two lens groups that move for focus adjustment are the second lens group and the third lens group.

7. The wide-angle lens of claim 3, wherein the two lens groups that move for focus adjustment are the second lens group and the third lens group.

8. The wide-angle lens of claim 4, wherein the two lens groups that move for focus adjustment are the second lens group and the third lens group.

9. The wide-angle lens of claim 1, wherein the third lens group includes a positive lens element and a negative lens element, which may be joined.

10. The wide-angle lens of claim 2, wherein the third lens group includes a positive lens element and a negative lens element, which may be joined.

11. The wide-angle lens of claim 3, wherein the third lens group includes a positive lens element and a negative lens element, which may be joined.

12. The wide-angle lens of claim 4, wherein the third lens group includes a positive lens element and a negative lens element, which may be joined.

13. The wide-angle lens of claim 5, wherein the third lens group includes a positive lens element and a negative lens element, which may be joined.

14. The wide-angle lens of claim 6, wherein the third lens group includes a positive lens element and a negative lens element, which may be joined.

15. The wide-angle lens of claim 7, wherein the third lens group includes a positive lens element and a negative lens element, which may be joined.

16. The wide-angle lens of claim 8, wherein the third lens group includes a positive lens element and a negative lens element, which may be joined.

* * * * *

UNITED STATES PATENT AND TRADEMARK OFFICE
CERTIFICATE OF CORRECTION

PATENT NO. : 6,301,058 B1
DATED : October 9, 2001
INVENTOR(S) : Nagahara

It is certified that error appears in the above-identified patent and that said Letters Patent is hereby corrected as shown below:

Column 4,
Line 37, change "$f_3/f$" to -- $f_{13}/f$ --;

Column 5,
Line 52, change "D14" to -- D15 --;

Column 6,
Line 51, change "D10at" to -- D10 at --; and
Line 54, change "$f_3/f$" to -- $f_{13}/f$ --.

Signed and Sealed this

Eleventh Day of June, 2002

Attest:

Attesting Officer

JAMES E. ROGAN
*Director of the United States Patent and Trademark Office*